US007770595B2

(12) United States Patent
Kirchner et al.

(10) Patent No.: US 7,770,595 B2
(45) Date of Patent: Aug. 10, 2010

(54) FLOW CONTROL VALVE

(75) Inventors: Mark W. Kirchner, Seattle, WA (US); John D. Tomlinson, Seattle, WA (US)

(73) Assignee: Sko Flo Industries, Inc., Woodinville, WA (US)

( * ) Notice: Subject to any disclaimer, the term of this patent is extended or adjusted under 35 U.S.C. 154(b) by 450 days.

(21) Appl. No.: 11/741,477

(22) Filed: Apr. 27, 2007

(65) Prior Publication Data

US 2007/0289640 A1    Dec. 20, 2007

Related U.S. Application Data

(60) Provisional application No. 60/795,748, filed on Apr. 27, 2006.

(51) Int. Cl.
*G05D 7/01* (2006.01)
(52) U.S. Cl. ...................... 137/501; 251/327
(58) Field of Classification Search .......... 137/501, 137/625.3, 625.38, 625.39; 251/327
See application file for complete search history.

(56) References Cited

U.S. PATENT DOCUMENTS

| 988,495 | A | 4/1911 | Noyes |
| 1,586,834 | A | 6/1926 | Ormsby |
| 1,777,261 | A | 9/1930 | Grainger et al. |
| 2,693,701 | A | 11/1954 | Whitworth et al. |
| 2,751,935 | A | 6/1956 | Smith |
| 3,079,953 | A | 3/1963 | Mounteer |
| 3,344,805 | A | 10/1967 | Wapner |
| 3,434,395 | A | 3/1969 | Londal |
| 3,575,088 | A | 4/1971 | Bauer |

(Continued)

FOREIGN PATENT DOCUMENTS

DE    3 919 299    1/1990

(Continued)

OTHER PUBLICATIONS

International Search Report and Written Opinion for PCT/US2007/067688; SKO FLO Industries, Inc.; May 30, 2008; p. 1-9.

(Continued)

*Primary Examiner*—Stephen Hepperle
(74) *Attorney, Agent, or Firm*—Perkins Coie LLP

(57) ABSTRACT

In one embodiment, a constant-flow valve assembly is provided that comprises a first fluid passageway carrying fluid at a first fluid pressure, a piston chamber, and a second fluid passageway connected to the chamber and carrying fluid at the second fluid pressure. A third fluid passageway is configured to carry fluid at a third fluid pressure. An adjustable valve member is provided between the chamber and the third passageway to provide constant fluid flow to the third passageway. An adjustable restrictor assembly is positioned between the first and second fluid passageways. An inlet portion of the restrictor assembly receives fluid at the first fluid pressure and directs the fluid to a restrictor. An outlet portion receives fluid from the restrictor and directs the fluid to the second fluid passageway at the second fluid pressure. The restrictor is movable to adjust the position of entry and exit portions relative to the inlet and outlet portions to adjust a fluid flow rate through fluid pathway to the second fluid passageway, thereby adjusting the flow rate through the valve assembly.

23 Claims, 11 Drawing Sheets

U.S. PATENT DOCUMENTS

| | | |
|---|---|---|
| 3,613,517 A | 10/1971 | Bradley |
| 3,677,288 A | 7/1972 | Martin |
| 3,853,143 A | 12/1974 | De Lepeleire |
| 3,969,991 A | 7/1976 | Comstock |
| 3,999,528 A | 12/1976 | Knapp et al. |
| 4,015,626 A | 4/1977 | Thordarson |
| 4,055,084 A | 10/1977 | Wilde et al. |
| 4,096,747 A | 6/1978 | Gilson |
| 4,098,285 A | 7/1978 | Karing |
| 4,131,128 A | 12/1978 | Gotzenberger |
| 4,161,961 A | 7/1979 | Knapp et al. |
| 4,176,686 A | 12/1979 | Stahle |
| 4,177,830 A | 12/1979 | Munson |
| 4,210,171 A | 7/1980 | Rikuta et al. |
| 4,228,777 A | 10/1980 | Haase |
| 4,234,013 A | 11/1980 | Rikuta et al. |
| 4,241,757 A | 12/1980 | Bron |
| 4,250,914 A | 2/1981 | Ferrentino |
| 4,250,915 A | 2/1981 | Rikuta et al. |
| 4,254,791 A | 3/1981 | Bron |
| 4,278,010 A | 7/1981 | Wallischeck et al. |
| 4,343,305 A | 8/1982 | Bron |
| 4,361,147 A | 11/1982 | Aslanian et al. |
| 4,372,147 A | 2/1983 | Waugh et al. |
| 4,422,470 A | 12/1983 | Jackson et al. |
| 4,428,397 A | 1/1984 | Bron |
| 4,429,708 A | 2/1984 | Strueh |
| 4,449,548 A | 5/1984 | Tutherly |
| 4,508,140 A | 4/1985 | Harrison |
| 4,513,777 A | 4/1985 | Wright |
| 4,541,454 A | 9/1985 | Sturman et al. |
| 4,549,426 A | 10/1985 | Erickson |
| 4,549,572 A | 10/1985 | Wright |
| 4,634,095 A | 1/1987 | Taylor |
| 4,673,162 A | 6/1987 | Lachmann et al. |
| 4,679,592 A | 7/1987 | Lamb |
| 4,809,589 A | 3/1989 | Bertrand |
| 4,809,746 A | 3/1989 | Wolfges |
| 4,813,447 A | 3/1989 | Ichiryu et al. |
| 4,829,808 A | 5/1989 | West |
| 4,893,649 A | 1/1990 | Skoglund |
| 4,921,547 A | 5/1990 | Kosarzecki |
| 4,987,740 A | 1/1991 | Coleman |
| 5,000,219 A | 3/1991 | Taube, Sr. et al. |
| 5,004,006 A | 4/1991 | Jung et al. |
| 5,061,454 A | 10/1991 | Birk |
| 5,101,854 A | 4/1992 | Bron |
| 5,143,116 A | 9/1992 | Skoglund |
| 5,190,075 A | 3/1993 | Tentler et al. |
| 5,214,939 A | 6/1993 | Drucker et al. |
| 5,234,025 A | 8/1993 | Skoglund |
| 5,247,139 A | 9/1993 | Schon et al. |
| 5,249,773 A | 10/1993 | Feld |
| 5,251,655 A | 10/1993 | Low |
| 5,255,711 A | 10/1993 | Reeds |
| 5,280,805 A | 1/1994 | Skoglund |
| 5,295,506 A | 3/1994 | Smith |
| 5,299,775 A | 4/1994 | Kolze |
| 5,301,713 A | 4/1994 | Skoglund |
| 5,363,876 A | 11/1994 | Nash |
| 5,377,955 A | 1/1995 | Baker |
| 5,383,489 A | 1/1995 | Golestan et al. |
| 5,408,886 A | 4/1995 | Lalin |
| 5,421,363 A | 6/1995 | Bron |
| 5,427,139 A | 6/1995 | Hilton |
| 5,427,149 A | 6/1995 | Higgs |
| 5,450,873 A | 9/1995 | Palmer |
| 5,490,539 A | 2/1996 | Ottestad et al. |
| 5,495,869 A | 3/1996 | Hashida |
| 5,562,002 A | 10/1996 | Lalin |
| 5,597,012 A | 1/1997 | Moinard et al. |
| 5,615,708 A | 4/1997 | Barron |
| 5,622,204 A | 4/1997 | Skoglund |
| 5,634,491 A | 6/1997 | Benedict |
| 5,638,861 A | 6/1997 | Hashida |
| 5,642,752 A | 7/1997 | Yokota |
| 5,655,568 A | 8/1997 | Bhargava et al. |
| 5,662,142 A | 9/1997 | Ansite |
| 5,673,607 A | 10/1997 | Schwab |
| 5,680,889 A | 10/1997 | Boger |
| 5,718,410 A | 2/1998 | Baumann |
| 5,727,529 A | 3/1998 | Tuckey |
| 5,775,369 A | 7/1998 | Hagmann et al. |
| 5,806,557 A | 9/1998 | Helge |
| 5,853,022 A | 12/1998 | Eggleston et al. |
| 5,878,766 A | 3/1999 | Dekhtyar |
| 5,904,177 A | 5/1999 | Mullin et al. |
| 5,931,186 A | 8/1999 | Skoglund |
| 5,964,408 A | 10/1999 | Musson |
| 5,971,012 A | 10/1999 | Skoglund |
| 5,975,654 A | 11/1999 | Zaviska et al. |
| 5,979,495 A | 11/1999 | Taube et al. |
| 5,988,211 A | 11/1999 | Cornell |
| 5,996,615 A | 12/1999 | Zuegner et al. |
| 6,026,849 A | 2/2000 | Thordarson |
| 6,026,850 A | 2/2000 | Newton et al. |
| 6,041,807 A | 3/2000 | Honaga et al. |
| 6,062,257 A | 5/2000 | Wild et al. |
| 6,062,534 A | 5/2000 | Eggleston |
| 6,098,598 A | 8/2000 | Riefenstahl et al. |
| 6,110,427 A | 8/2000 | Uffenheimer |
| 6,135,142 A | 10/2000 | Yokota et al. |
| 6,167,906 B1 | 1/2001 | Liberfarb |
| 6,189,564 B1 | 2/2001 | Hilton |
| 6,209,578 B1 | 4/2001 | Newton |
| 6,254,576 B1 | 7/2001 | Shekalim |
| 6,298,879 B1 | 10/2001 | Knapp et al. |
| 6,314,980 B1 | 11/2001 | Beswick et al. |
| 6,443,174 B2 | 9/2002 | Mudd |
| 6,568,656 B1 | 5/2003 | Wrocklage |
| 6,616,837 B2 | 9/2003 | Tovar De Pablos et al. |
| 6,640,830 B2 | 11/2003 | Zahe et al. |
| 6,644,345 B2 | 11/2003 | Dulin |
| 6,688,319 B2 | 2/2004 | Trantham et al. |
| 6,729,346 B2 | 5/2004 | Fuhrmann et al. |
| 6,751,939 B2 | 6/2004 | Futa, Jr. et al. |
| 6,932,107 B2 | 8/2005 | Kirchner et al. |
| 7,128,086 B2 | 10/2006 | Kirchner et al. |
| 2001/0032675 A1 | 10/2001 | Russell |
| 2002/0008219 A1 | 1/2002 | Yokoyama et al. |
| 2002/0100506 A1 | 8/2002 | May |
| 2002/0134441 A1 | 9/2002 | Kusumoto et al. |
| 2003/0012845 A1 | 1/2003 | Doyle et al. |
| 2003/0041902 A1 | 3/2003 | Dulin |
| 2003/0051754 A1 | 3/2003 | Kirkman et al. |
| 2003/0084940 A1 | 5/2003 | Lee |
| 2003/0192597 A1 | 10/2003 | Trantham et al. |
| 2004/0011406 A1 | 1/2004 | Weber |
| 2004/0154672 A1 | 8/2004 | Liberfarb |
| 2004/0202552 A1 | 10/2004 | Okii et al. |
| 2005/0002831 A1 | 1/2005 | Ashe et al. |
| 2005/0016597 A1 | 1/2005 | Hope et al. |
| 2005/0077099 A1 | 4/2005 | Hayashi et al. |
| 2005/0092368 A1 | 5/2005 | Tahir et al. |
| 2005/0189508 A1 | 9/2005 | Beswick et al. |
| 2005/0199289 A1 | 9/2005 | McDonald et al. |
| 2005/0211305 A1 | 9/2005 | Kirchner et al. |
| 2005/0211942 A1 | 9/2005 | Koester et al. |
| 2005/0230494 A1 | 10/2005 | Lucas et al. |
| 2005/0263280 A1 | 12/2005 | Sellers et al. |

| 2006/0060252 A1 | 3/2006 | Taylor | WO | WO-01/13017 | 2/2001 |
| --- | --- | --- | --- | --- | --- |
| | | | WO | WO-2005/005841 A2 | 1/2005 |

FOREIGN PATENT DOCUMENTS

| FR | 2 353 093 | 12/1977 |
| --- | --- | --- |
| JP | 404290678 | 10/1992 |

OTHER PUBLICATIONS

U.S. Appl. No. 10/823,038, Kirchner.

US 7,770,595 B2

FLOW CONTROL VALVE

CROSS-REFERENCE TO RELATED APPLICATION

This non-provisional patent application claims priority to U.S. Provisional Patent Application No. 60/795,748, filed Apr. 27, 2006, which is hereby incorporated herein by reference thereto.

TECHNICAL FIELD

This invention relates to generally constant flow control valves. More particularly, several aspects of the invention are directed toward valves that maintain a substantially constant flow despite changes in the pressure drop across the valve.

BACKGROUND

In the production of oil and gas, chemicals such as corrosion inhibitors, scale inhibitors, paraffin inhibitors, hydrate inhibitors, and demulsifiers are typically injected into the wells to maintain efficient flow of oil or gas. These chemicals usually need to be added to the wells production at a constant rate. Often one pump is used to inject the same chemical into several wells with the use of pressure compensated rate control valves at each injection point. The use of these rate controllers reduces set up and operating costs of injection systems because the alternative is to install a separate pump for each injection point and to maintain several pumps instead of one. These injection valves must be pressure compensated because they need to maintain a rate set point with changes of several thousand pounds per square inch across them to accommodate fluctuations in well pressure. A typical chemical injection rate for an oil well is between 0.5 to 200 US gallons per day. Injection pressures range between 500 to 20,000 psi.

The most robust method to date to achieve rates in this range using pressure compensated rate controllers is to govern the pressure drop across a fixed orifice. The set point for this method is changed by varying the pressure drop across the orifice. This method is described in U.S. Pat. No. 4,893,649. Previous methods to vary the area while maintaining a constant pressure drop have not adequately worked in the low flow range because passages created by mating needles and trims or mating threads to restrict flow are often less than 0.001 inches wide, which makes them prone to clogging and/or filming. The fixed orifice method is robust since hole passage can be made to pass the largest debris for a given flow area and several holes cascading in series can be used to give the same resistance with as much as a twenty fold increase in the flow area reducing the filming and clogging tendencies. The consequences of varying the pressure drop across a fixed resistor is that the range of flow rate set point is limited and passages cannot be opened up to pass blockages as can be done with a mating needle and trim.

Set point range of a valve is defined by its "turn down," which equals the valve's highest flow rate divided by the lowest flow rate achievable. For a fixed valve orifice, the turn down is calculated by taking the square root of the highest pressure drop across the orifice divided by the lowest pressure drop. For example, a valve that offers a pressure drop across the orifice of 200 psi at maximum flow and 2 psi at minimum flow will have a turn down of 10:1. During the life of the well the flow rate range may need to be adjusted, which involves replacing an orifice. Sending personnel or equipment to remote locations to change an orifice represents a substantial expense, particularly if the valve location is under water.

SUMMARY

A constant-flow valve assembly is provided that overcomes drawbacks experienced in the prior art and provides other benefits. In one embodiment, a constant-flow valve assembly comprises a first fluid passageway configured to carry fluid at a first fluid pressure, a chamber having at least a portion configured to receive fluid at a second fluid pressure less than the first fluid pressure; and a second fluid passageway connected to the portion of the piston chamber and configured to carry fluid at the second fluid pressure. A third fluid passageway is configured to carry fluid at a third fluid pressure less than the first and second fluid pressures. A piston is slideably disposed in the chamber, and an adjustable valve member is provided between the chamber and the third passageway.

The adjustable valve member is configured to provide a substantially constant fluid flow to the third passageway substantially independent of the pressure differentials between the second and third fluid pressures. An adjustable restrictor assembly is between the first and second fluid passageways. The restrictor assembly has an inlet portion, an outlet portion, and a restrictor with a fluid pathway extending therebetween. The inlet portion is positioned to receive fluid at the first fluid pressure from the first fluid passageway and to direct the fluid to the restrictor. The outlet portion is positioned to receive fluid from the restrictor and direct fluid to the second fluid passageway at the second fluid pressure. The restrictor has an entry portion and an exit portion of the fluid pathway. The restrictor is movable to adjust the position of the entry and exit portions relative to the inlet and outlet portions to adjust a fluid flow rate of fluid through the fluid pathway to the second fluid passageway, thereby adjusting the flow rate through the valve assembly.

In another embodiment a constant-flow valve assembly comprises a first fluid passageway with fluid at a first fluid pressure, a chamber containing fluid at a second fluid pressure less than the first fluid pressure, and a second fluid passageway connected to the portion of the chamber and containing fluid at the second fluid pressure. A third fluid passageway has fluid at a third fluid pressure less than the first and second fluid pressures. A piston is slideably disposed in the chamber. A biased valve member having a biasing member and a valve body is coupled to the piston. The valve body is positioned between the chamber and the third passageway and configured to provide a substantially constant fluid flow to the third passageway substantially independent of pressure differentials between the second and third fluid pressures.

A restrictor assembly is between the first and second fluid passageways. The restrictor assembly has a first sealing pad, a second sealing pad, and a restrictor with a fluid pathway extending therebetween. The first sealing pad is positioned to receive fluid at the first fluid pressure from the first fluid passageway and to direct the fluid to the restrictor. The second sealing pad is positioned to receive fluid from the restrictor and direct fluid to the second fluid passageway at the second fluid pressure. The restrictor is movable to adjust the position of the fluid pathway relative to the inlet and outlet portions to adjust a fluid flow rate of fluid through the fluid pathway to the second fluid passageway, thereby adjusting the flow rate through the valve assembly.

Another embodiment provides a constant-flow valve assembly that comprises a body portion having a first fluid inlet, a piston chamber, and a first fluid outlet. The first fluid inlet receives fluid at a first fluid pressure. The piston chamber has a first portion exposed to the fluid at the first fluid pressure and has a second portion exposed to fluid having a second fluid pressure less than the first fluid pressure. The first fluid outlet is configured to carry fluid at a third fluid pressure less than the first and second fluid pressures. A piston is slideably disposed in the piston chamber. A seal in the piston chamber between the piston and the body separates one portion of the fluid at the first fluid pressure from another portion of the fluid at the second fluid pressure. A valve member is coupled to the piston in the second portion of the piston chamber and is configured to provide a substantially constant fluid flow from the second portion of the piston chamber toward the outlet substantially independent of the pressure differentials between the first, second, and third fluid pressures.

A first fluid passageway is connected to the first portion of the piston chamber and configured to contain fluid at the first fluid pressure. A second fluid passageway is connected to the second portion of the piston chamber and configured to contain fluid at the second fluid pressure. An adjustable restrictor assembly is coupled to the body between the first and second fluid passageways. The restrictor assembly has a second inlet portion, a second outlet portion, and a restrictor body with a fluid pathway extending therebetween. The second inlet portion is positioned to receive fluid from the first fluid passageway. The second outlet portion is positioned to direct fluid to the second fluid passageway. The restrictor body has an entry portion and an exit portion of the fluid pathway, the restrictor body is movable relative to the second inlet portion to adjust how much of the entry portion is uncovered by the second inlet portion to receive fluid directly therefrom and how much of the entry portion is covered by the second inlet portion to restrict a flow rate through the entry portion to the exit portion, thereby adjusting the flow rate through the valve assembly independent of the differences in the first, second, and third fluid pressures.

DETAILED DESCRIPTION

Figure 1:
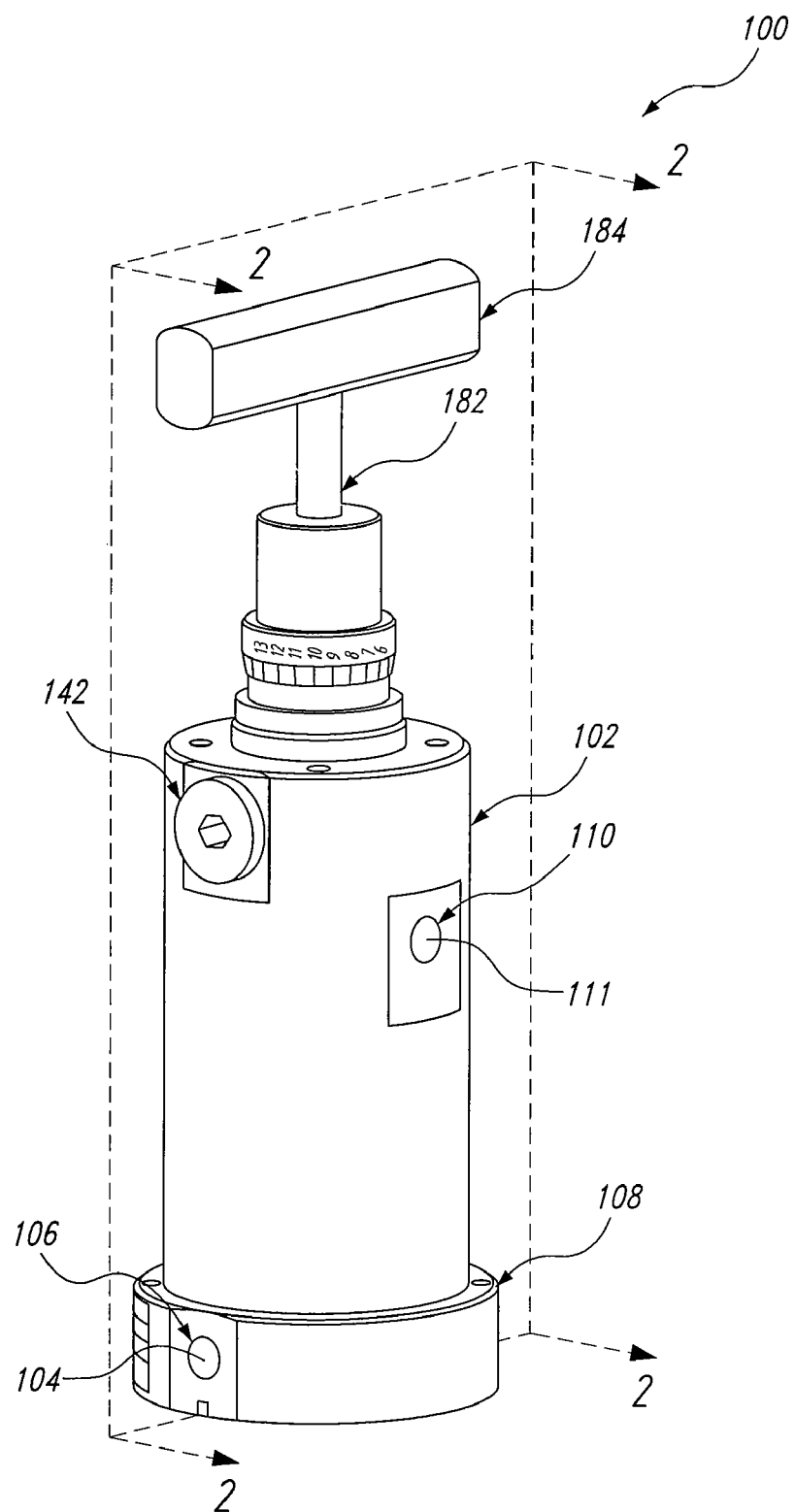
FIG. 1 is an isometric view of a constant flow valve assembly in accordance with an embodiment of the present invention.

The present invention is directed toward flow control valves. In the following description, numerous specific details are provided, such as particular valve configurations, to provide a thorough understanding of and an enabling description for embodiments of the invention. Those of ordinary skill in the art, however, will recognize that the invention can be practiced without one or more of the specific details explained in the following description. In other instances, well-known structures or operation are not shown or described in detail to avoid obscuring aspects of the invention.

One aspect of the invention is directed to a flow control valve for providing a substantially constant flow of fluid through the valve. An aspect of the valve is to provide a substantially wide range of flow rate set points. In one embodiment, the valve includes a valve body with a series of concentric bores and an end cap with an inlet in the end cap and an outlet in the valve body. The body contains a piston movably disposed in a piston bore and a shaft with a spool-shaped portion movably displaced in a second, third and fourth bore that are both concentric to the piston bore. A first flow passageway is provided between the inlet and a first restriction in a variable restrictor assembly, which share inlet fluid pressure (P1). The restrictor assembly is comprised of a first sealing pad with a hole in the center that slides over a face of a restrictor, and the face contains a notched opening. The sealing pad is urged against the face with a sealing pad spring. The notched opening is axially displaced relative to the sealing pad by moving the shaft's spool portion, which is powered by a handle turning a power screw. Another passageway is provided down stream of the first restriction and upstream of a mating cone-shaped pin and seat, which share intermediate fluid pressure (P2). The cone-shaped pin is supported in the center of the piston with its shank concentric to the round opening in the seat, which is attached to the end of the shaft. An outlet passageway is provided down stream of the mating pin and seat to the outlet of the valve, which shares outlet fluid pressure (P3).

A dynamic seal is positioned proximate to the piston and piston bore and separates the first passageway (with fluid pressure P1) from the second passageway (with fluid pressure P2). The dynamic seal defines a first effective area. The valve also includes a biasing member configured to urge the piston in a first direction toward the first passageway (P1). The inside diameter of the seat defines a second effective area which is substantially smaller than the first effective area.

In one aspect of this embodiment, the valve is configured so that changes in pressure drop across the valve do not generally affect the flow rate of the fluid passing through the valve. In another aspect of this embodiment, the valve further includes an adjustable throttling member formed by the variable restrictor assembly comprised of the first restriction. The urging of the movably disposed piston and pin, which mates with the seat, creates a force balance across the piston that governs the pressure drop across the throttling member, which in turn maintains substantially constant flow with substantially large pressure drop fluctuations across the valve. The throttling member can be movable to vary the size of the opening in the first restriction. The movement of the shaft's distal end portion that creates a change in this opening also changes the force setting of the biasing member on the P2 side of the piston. The double purpose of the shaft's movement creates a substantially wide range of flow rate set point because, at the lowest flow rate, the smallest hole in the first restriction is exposed, and at this set point the lowest pressure drop across the first restriction exists.

Figure 2:
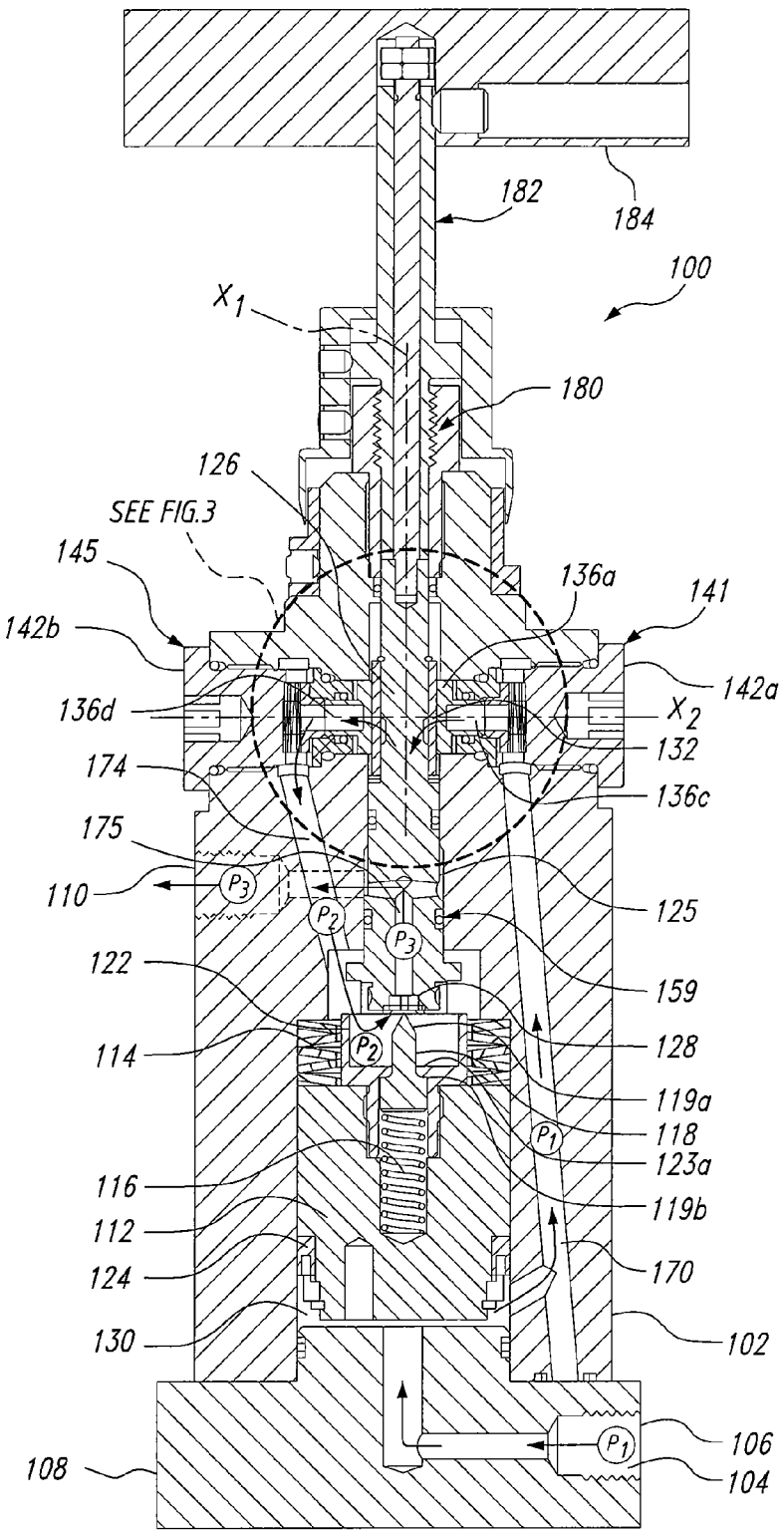
FIG. 2 is an enlarged schematic cross-sectional view of the valve assembly taken substantially along lines 2-2 of FIG. 1.
Figure 3:
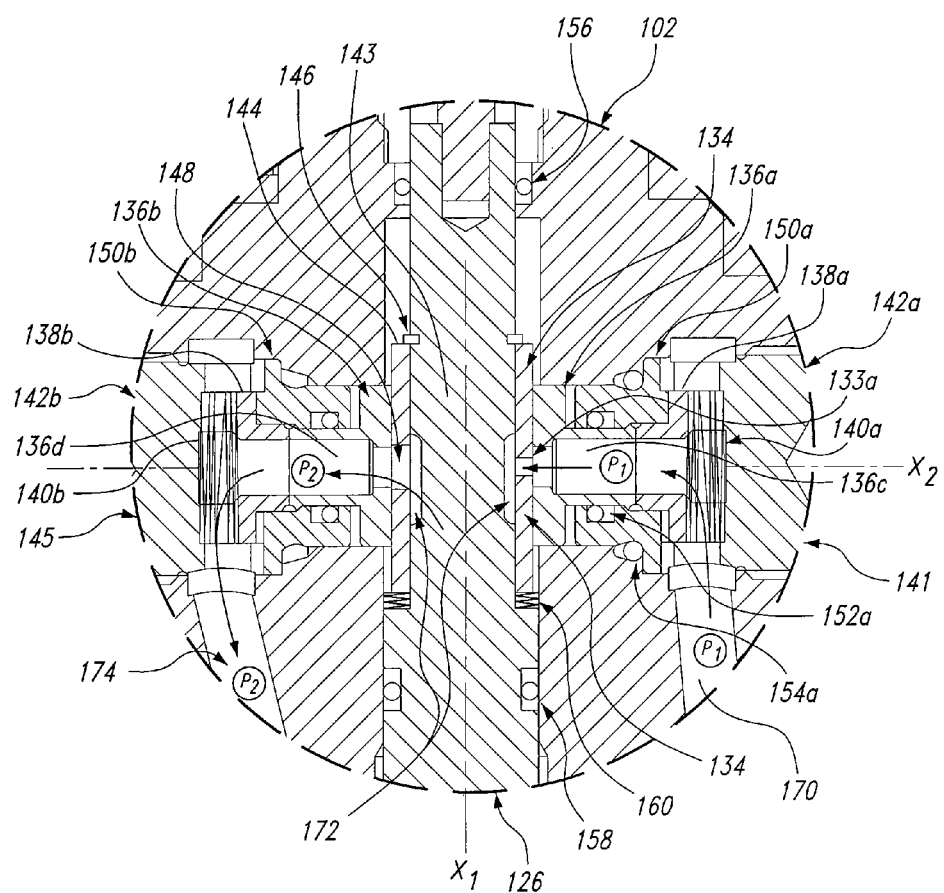
FIG. 3 is an enlarged cross-sectional view of a portion of the valve assembly where indicated in FIG. 2 and showing a restrictor assembly.

FIG. 1 is an isometric view of valve assembly 100 for controlling the flow of a fluid in accordance with one embodiment of the invention. FIG. 2 is an enlarged schematic cross-sectional view of the valve assembly 100 taken substantially along lines 2-2 of FIG. 1. FIG. 3 is an enlarged schematic cross-sectional view of a portion of the valve assembly 100 where indicated in FIG. 2. The valve assembly 100 includes a valve body 102 and an inlet cap 108 that contains an inlet fitting 106 with an aperture defining a flow inlet 104. The valve body 102 contains an outlet fitting 110 with an aperture that defines a flow outlet 111.

As best seen in FIG. 2, the valve body 102 contains a series of concentric bores common to longitudinal axis X1 that contain the piston 112, a piston biasing member 114, and a central shaft 125 with a spool portion 126. Attached to the lower end of the shaft 125 and axially aligned with the shaft is a seat 128 with a round inside diameter that mates with a cone-shaped end 119a of a pin 118 supported by the piston 112. A pin retainer 122 sitting atop the piston 112 centers the pin 118 and provides a shoulder 123a for a mating shoulder 119b of the pin 118 against which to slide. A pin spring 116 between the pin 118 and the piston 112 provides a force to keep the pin shoulder 119b in contact with the shoulder 123a and centered to the seat 128. The spring 116 also prevents the pin from "crashing" against the seat, as described in U.S. Pat. No. 4,893,649, which is hereby incorporated in its entirety herein by reference thereto. The movement of the piston 112 and the pin 118 along the longitudinal axis X1 relative to the seat 128 is configured to maintain a constant fluid flow rate through the valve assembly 100 despite changes in the pressure drop across the valve 100, as described below in detail.

A cup seal 124 is attached to the piston 112 and sealably engages the piston bore 130. The cup seal 124 separates fluid within the valve assembly's flow path, so inlet pressure (P1) is on one side of the cup seal (e.g., below the cup seal) and fluid at an intermediate pressure (P2) is on the other side of the cup seal (e.g., above the cup seal). As discussed below, the fluid at intermediate pressure P2 is within a series of passageways down stream of a variable restrictor assembly 132 (discussed below). In other embodiments, the cup seal 124 could be substituted with an "O" ring or other sealing member, such as a bellows or diaphragm.

The piston 112 and pin 118 are urged away from the seat 128 along the longitudinal axis X1 with the biasing member 114. In the illustrated embodiment, the biasing member 114 is a stack of disk springs, but other biasing devices, such as a coil spring mechanism, can be used to provide a biasing force against the piston 112 away from the seat 128. The arrangement of the spring-biased piston and pin mating with the seat 128 maintains substantially constant flow through the valve 100 independent of the pressure drop across the valve 100 assembly because the piston, pin and seat 128 maintain a substantially constant pressure drop across the variable restrictor assembly 132.

The constant flow configuration independent of the valve's outlet pressure (P3) is demonstrated by the force balance equation:

$$P1(A_{piston}) = P2(A_{piston} - A_{seat}) + K_{spring} * X_{spring} + \text{Seal drag} - (P2-P3)A_{seat}$$

Where:
$A_{piston}$=area enclosed by the piston bore 130
$A_{seat}$=effective area enclosed by the inside diameter of the seat 118
$K_{spring}$=spring constant of the biasing member 114
Seal drag=drag of seal 124
$X_{spring}$=spring deflection of the biasing member 114

The effective area $A_{seat}$ is enclosed by the mating inside diameter of the seat 128 and the cone-shaped end 119a of the pin 118.

The lower portion of the piston bore 130 below the cup seal 124 is connected to a flow passageway 170 formed by a hole drilled in the body. The flow passageway 170 carries fluid at pressure P1 from the inlet to the variable restrictor assembly 132. As best seen in FIGS. 2-5, the variable restrictor assembly 132 of the illustrated embodiment includes an inlet sealing pad portion 141, a restrictor 143, and an outlet sealing pad portion 145. The inlet sealing pad portion 141 includes a sealing pad 136a pressed against the restrictor 143 by a biasing member, such as a pad springs 140a. The pad spring 140a presses against a pad cap 142a, which is securely screwed into a threaded aperture in the valve body 102.

In the illustrated embodiment, the restrictor 143 includes a hollow cylinder 134 in the form of a sleeve fixed to the shaft 125 around the spool portion 126. The hollow cylinder 134 has a flat surface 135a against which the sealing pad 136a presses. In the illustrated embodiment, the sealing pad 136a is urged along lateral axis X2 toward the first flat surface 135a on the hollow cylinder 134 by the pad springs 140a, which pushes on a pad pusher 138a between the pad springs and the sealing pad. The pad springs 140a can be of a spring design such as a Belleville washer, wave washer, coil spring, or other biasing device. The pad pusher 138a and the pad springs 140a are guided by the pad cap 142a. The sealing pad 136a is guided along the lateral axis X2 by the body 102 and a sealing pad guide 150a. The sealing pad guide 150a retains an inner seal 152a and an outer seal 154a which prevents fluid leakage and maintains the fluid flow at pressure P1 through the flow passageway 170, the inside diameter of the sealing pad 136a and the upstream side of the variable restrictor 143.

The hollow cylinder 134 has a second flat engagement surface 135b. A second sealing pad 136b on the outlet side of the hollow cylinder 134 is pressed against the second flat surface 135b by second pad springs 140b, a second pad cap 142b, and a second pad pusher 138b. The pad pusher 138b and the sealing pad 136b are guided by a second sealing pad guide 150b so that the sealing pad 136b is also urged along the lateral axis x2 toward the restrictor 143.

As best seen in FIGS. 2 and 3, the fluid at pressure P1 flows from the lower portion of the piston bore 130 (FIG. 2) through the first flow passageway 170, into a central aperture 133d in the sealing pad 136a, and into the restrictor 143 via a through-hole 133a and associated surface restrictions on the first flat surface 135a to control flow rate, as discussed in detail below. The fluid exits the restrictor 143 via a through-hole 148 in the hollow cylinder 134 on the second flat surface 135b, and into a central aperture 136d in the second sealing pad 136b. The fluid entering the second sealing pad 136b is at a fluid pressure P2, which is less than the fluid pressure P1. The fluid flows from the second sealing pad 136b into a second flow passageway 174, which carries the fluid to the pin 118 and the seat 128 at the bottom portion of the shaft 125 (FIG. 2).

In the illustrated embodiment, the through-hole 148 on the outlet side is larger than the through-hole 133a on the inlet side, so surface restrictions on the second flat surface 135b are not needed for flow rate control. Because the restriction of through-hole 148 is quite small compared to the full flow condition of through-hole 133a, the pressure down stream of the through-hole 133a in the cavity 172 (FIG. 3) created between the inside of the hollow cylinder 134 and outer surface of the spool portion 126 and in the second sealing pad 136b is pressure P2. Because there is no meaningful pressure drop across the through-hole 148, additional seals are not needed around the second pad guide 150b. In other embodiments, however, seals may be provided around the second pad guide 150b similar to the seals 152a and 154a discussed above. In the illustrated embodiment, the fluid moving through the restrictor 143 is also blocked from migrating along the surface of the shaft 125 by upper and lower seals 156 and 158. The illustrated seals are groove seals disposed in annular grooves formed in the exterior of the shaft 125 above and below the hollow cylinder 134, such that the seals sealably engage the shaft and the valve body 102.

The fluid at pressure P2 flows through the second flow passageway 174 into the upper portion of the piston bore 130 that contains the piston biasing member 114 and pin 118. The largest restriction in the valve assembly 100 is created by the cone-shaped end 119a of the pin 118 mating with seat 128 on the end of the shaft 125. The fluid flows through the restriction between the pin 118 and the seat 128, thereby creating another drop in fluid pressure from P2 to P3. Down stream of the mating pin 118 and seat 128 is the common fluid pressure P3, which is bound by the center and cross hole 175 in shaft 125, the seals 156 and 159 between the shaft and the valve body, and the outlet fitting 110, such that the pressure of the fluid exiting the valve assembly is at pressure P3.

The hollow cylinder 134 is securely held on the shaft 125 about the spool portion 126, so that the hollow cylinder moves with the shaft as a unit along the longitudinal axis X1. In the illustrated embodiment, one end of the hollow cylinder 134 is bound by a thrust washer 144 and snap ring 146, which is anchored to the spool portion 126. The opposite end of the hollow cylinder 134 is bound by a spring 160 that urges the hollow cylinder 134 toward the thrust washer 144. The spring 160 can be a coil spring, a wave washer, Belleville washer design, or other biasing member.

As best seen in FIG. 2, the shaft 125 with the spool portion 126 is coupled to an adjustment handle 184 extending from the valve body 102. The handle 184 is coupled to a stem 182 and a power screw 180. When the handle 184 is turned to adjust the flow rate through the valve assembly, the stem 182 and the power screw 180 rotate and move axially, thereby causing the spool portion 126, the cylinder 134, the snap ring 146, and the thrust washer 144 to move as a unit axially along longitudinal axis X1. This movement of the hollow cylinder 134 results in the first and second flat surfaces 135a and 135b moving longitudinally relative to the respective sealing pads 136a and 136b. Accordingly, the through-hole 133a on the inlet side of the hollow cylinder 134 and the through-hole 148 on the outlet side also move relative to the central apertures 133d and 136d in the sealing pads 136a and 136b, such that all or portions of the through-hole 133a may be exposed to the fluid flow through the sealing pad.

Controlling the axial movement of the shaft 125 and the hollow cylinder 134 will control the position of the through-holes 133a and 148 relative to the sealing pads 136a and 136b, thereby controlling the fluid flow rate through the restrictor 143. The snap ring 146, thrust washer 144, and spring 160 provide a means of preventing backlash between the hollow cylinder 134 and the spool 126 during the axial movement. In one embodiment, the product of thrust from turning of the end of the stem 182 against the end of the shaft 125 and the friction forces between these two surfaces cause the spool portion 126 to rotate as it moves along longitudinal axis X1. Higher pressures in the valve assembly 100 create greater forces between the shaft 125 and the end of the stem 182, which results in greater torque applied to the shaft. The hollow cylinder 134 allows the spool portion 126 to rotate, preventing the spool torque from overcoming the torque that the sealing pads 136a and 136b exert on the hollow cylinder 134, which in turn allows the sealing pads 136a and 136b to maintain contact with their mating flat surfaces 135a and 135b on the hollow cylinder 134. If the sealing pads 136a and 136b were to lose contact with the mating flat surfaces 135a and 135b respectively, the exposed flow area of the variable restrictor assembly 132 would dramatically increase causing an undesirable increase in the flow rate set point.

Figure 4:
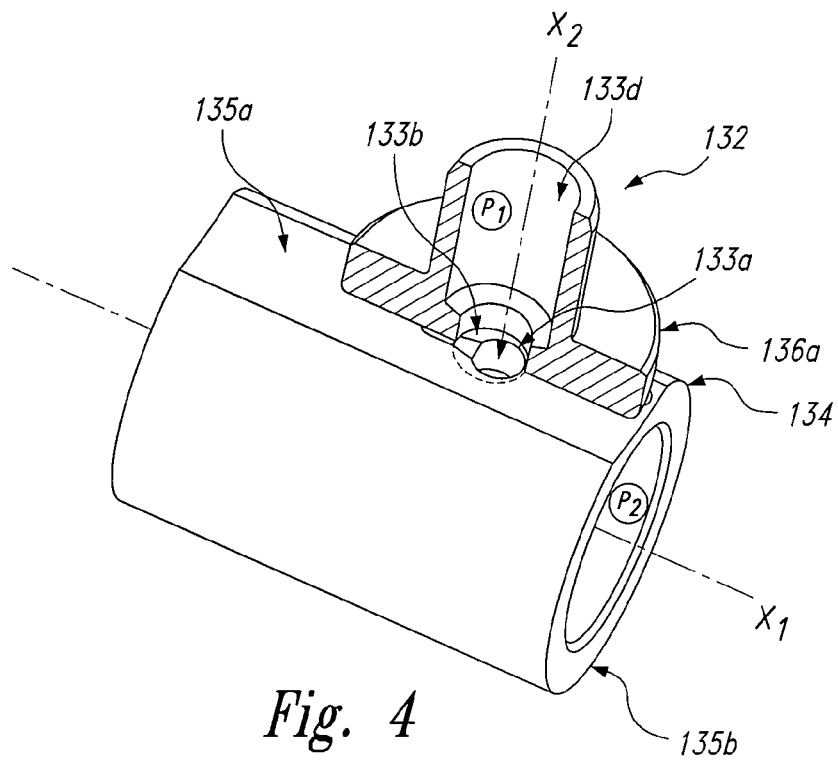
FIG. 4 is an enlarged isometric view and partial cutaway view of a geometry of a hollow cylinder and sealing pad shown removed from the restrictor assembly of FIGS. 2 and 3 and shown in an open-most condition.
Figure 5:
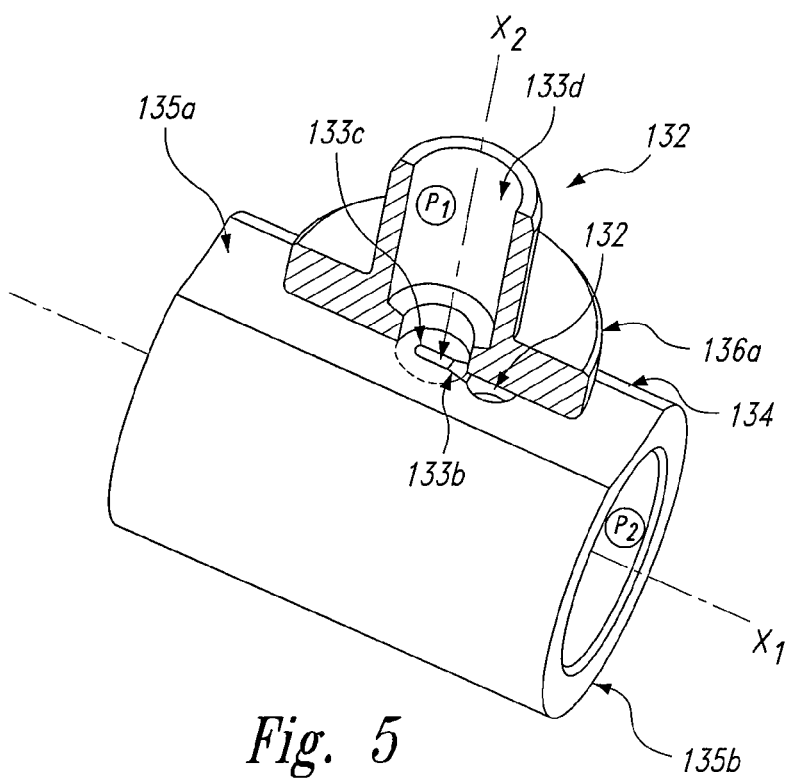
FIG. 5 is an enlarged isometric view and partial cutaway view of the geometry of the hollow cylinder and sealing pad of FIG. 4 and shown in a reduced flow position.

FIG. 4 and FIG. 5 show an enlarged isometric view of the sealing pad 136a mating with the flat surface 135a on the inlet side of the hollow cylinder 134, wherein only half of the sealing pad 136a is shown for illustrative purposes. The footprint of the inside diameter of the sealing pad's central aperture 133d is shown as dashed line 133d relative to the through-hole 133a. In the illustrated embodiment, the flat surface 135a of the hollow cylinder 134 also has a blind V-shaped notch 133b and a blind trench 133c recessed therein and coupled to the through-hole 133a. The trench 133c is configured to receive and direct fluid from the sealing pad's central aperture 133d to the notch 133b, and the notch directs the fluid into the through-hole 133a.

The hollow cylinder 134 is shown in FIG. 4 in a fully open position because the entire through-hole 133a is directly exposed to the sealing pad's central aperture 133d and fluid flowing there through. For this opening, the maximum spring tension in disk springs 114 (FIG. 2) exists, creating the maximum pressure drop through the through holes 133a and 133b, producing the maximum flow rate set point for the valve assembly 100.

The sealing pad 136a and hollow cylinder 134 are illustrated in FIG. 5 in a lower flow rate set point because a flange portion of the sealing pad 136a around the central aperture 133d is positioned to cover the entire through-hole 133a. In this position, only a portion of the V-shaped notch 133b and the trench 133c are within the footprint of the central aperture 133d and directly exposed to fluid flow there through. Accordingly, fluid will enter the exposed portions of the notch 133b and the trench 133c and will flow through the restriction created by the sealing pad 136a on the flat surface 135a over the notch 133b, and into the covered through-hole 133a for passage through the hollow cylinder 134. The through-hole 133a, the notch 133b, and the trench 133c are configured so that the fluid flow rate through the inlet side of the hollow cylinder 134 is directly related to how much of the trench, notch, and/or through-hole is within the footprint of the sealing pad's central aperture 133d and thereby directly exposed to the fluid flow there through. Accordingly, less exposed area of the trench/notch/through-hole provides a lower flow rate through the inlet side of the hollow cylinder, and more area exposed provides a greater flow rate. At the lower flow rate set point shown in FIG. 5, the minimum spring tension in disk springs 114 (FIG. 2) exists, creating the minimum pressure drop through the through hole 133b producing a lower flow rate set point than shown in FIG. 4. In other embodiments, such as those described below with reference to FIGS. 8-12, the restrictor 143 can have different configurations of trenches and/or notches to provide restrictions to fluid flow depending on the position of the shaft related to the sealing pads 136a and 136b.

Figure 6:
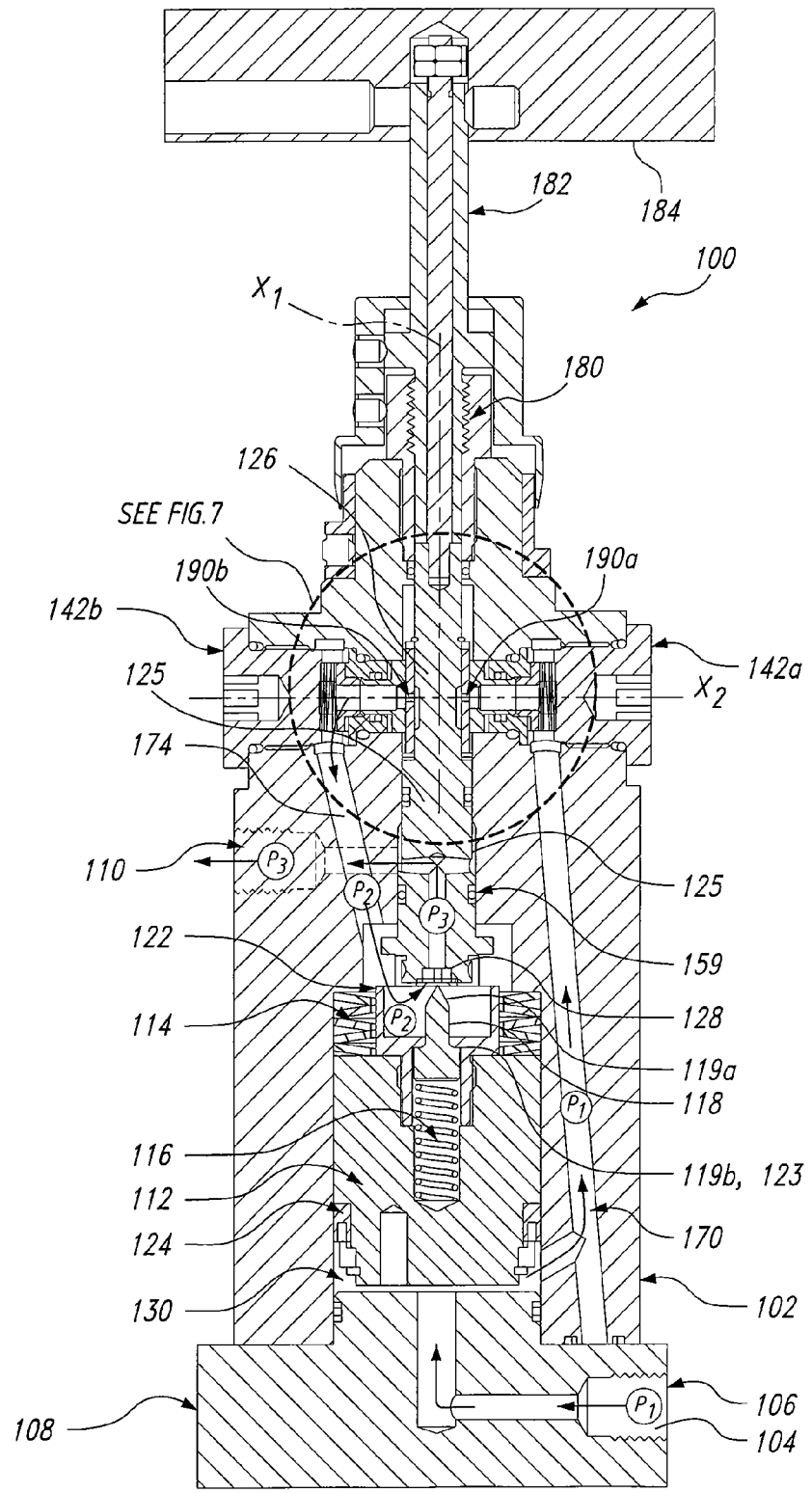
FIG. 6 is a schematic cross-sectional view of the valve assembly in accordance with another embodiment of the invention.
Figure 7:
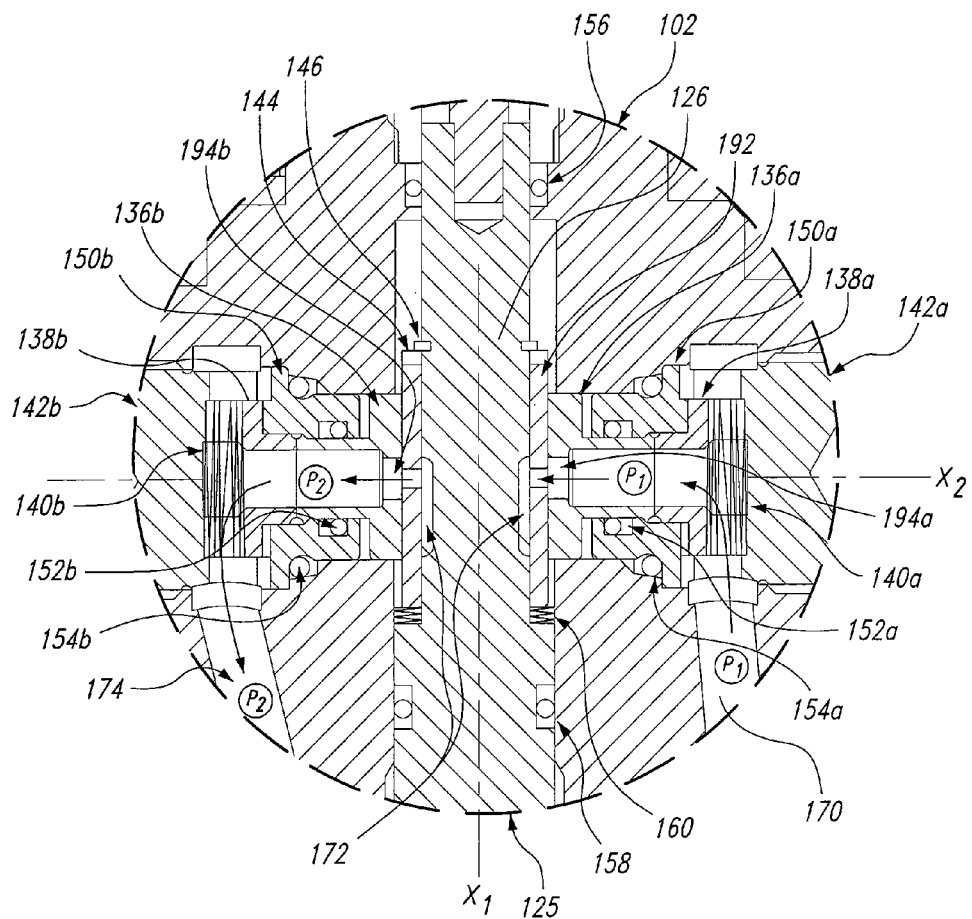
FIG. 7 an enlarged cross-sectional view of a portion of the valve assembly where indicated in FIG. 6 and showing a restrictor assembly.

FIG. 6 is a cross-sectional view of a valve assembly 100 in accordance with another embodiment, and FIG. 7 is an enlarged cross-sectional view of a portion of the valve assembly where indicated in FIG. 6. The valve assembly 100 has generally the same components as those described above and shown in FIGS. 1-5, so only the primary differences will be discussed. In this alternate embodiment, the restrictor 143 includes a flow restricting hollow cylinder 192 on the spool portion 126. The hollow cylinder 192 has a through-hole 198a in a flat surface 196a on the inlet side of the hollow cylinder 192. The sealing pad 136a on the inlet side is urged against the flat surface 196a as discussed above. The hollow cylinder 192 also has a through-hole 198b on a flat surface 196b on the outlet side of the hollow cylinder. The sealing pad 136b on the outlet side is urged against the flat surface 196b in the similar manner. In the illustrated embodiment, the through-hole 198a on the inlet side has approximately the same diameter as the through-hole 198b on the outlet side. The hollow cylinder 192 includes a plurality of flow restricting members (discussed below) on the flat surface 196a on the inlet side and connected to the through-hole 198a, such that the flow rate through the restrictor can be adjusted by adjusting the position of the hollow cylinder 192 relative to central aperture 133d in the sealing pad 136a. In at least one embodiment, flow restricting members can be provided on the flat surface 196b on the outlet side and connected to the through-hole 198b.

Figure 8:
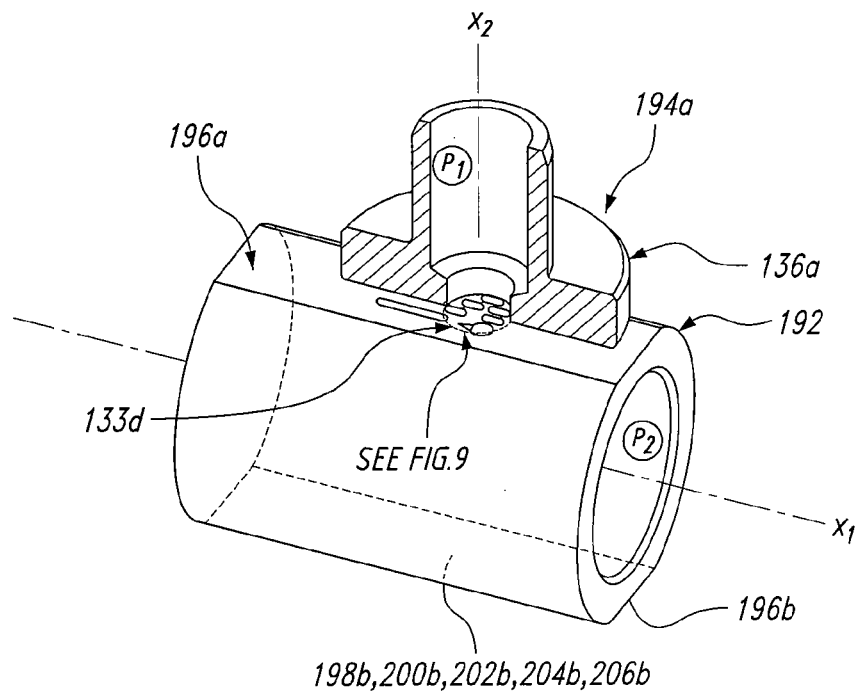
FIG. 8 is an enlarged isometric view and partial cutaway view of the geometry of a hollow cylinder and sealing pad shown removed from the restrictor assembly of FIGS. 6 and 7 and shown in the open-most condition and all flow through the receptacles and channels bypassed.
Figure 9:
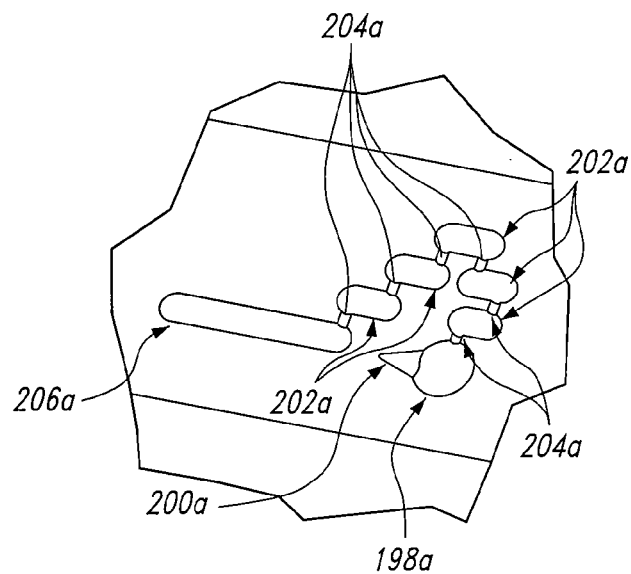
FIG. 9 is an enlarged isometric view of cascading notches and channels in the hollow cylinder of FIG. 8, with the sealing pad removed for purposes of clarity.

As best seen in FIGS. 8-12, the through-hole 198a is connected to a blind V-shaped notch 200a machined into the flat surface 196a on the outside of the hollow cylinder 192 on the inlet side. FIG. 9 is an enlarged isometric view of the hollow cylinder 192 showing the flat surface 196a, the through-hole 198a, and the flow restricting members. These flow restricting members include a plurality of blind receptacles, referred to as trenches 202a and 206a, interconnected by a plurality of blind channels 204a. The trenches 202a in the illustrated embodiment are radially and longitudinally offset from each other and run generally parallel to the longitudinal axis X1. Each trench 202a is connected to an adjacent trench or to the through-hole 198a by a channel 204a, thereby forming a series of cascading flow restrictions configured to allow for fluid flow through each trench in series to the through-hole 198a. The trenches 202a in the illustrated embodiment are deeper than the connecting channels 204a.

As best seen in FIG. 8, the hollow cylinder 192 can be positioned relative to the sealing pad 136a in a fully open position, so that the central aperture 133d of the sealing pad 136a and the associated fluid flow are directly over the through-hole 198a, the V-shaped notch 200a, and a plurality of the trenches 202a. As the hollow cylinder 192 is moved axially, the flat surface moves under the sealing pad 136a so that the flange of the sealing pad 136a slides over and covers at least a portion of the through-hole 198a, the V-shaped notch 200a, the channels 204a, and/or the trenches 202a, thereby decreasing the flow rate through the inlet side of the hollow cylinder. Accordingly the channels 204a and the trenches 202a are either engaged or bypassed in a series/parallel relationship with the fluid flow passing through the V-shaped notch 200a and the through-hole 198a.

As seen in FIG. 8, when the sealing pad 136a and the hollow cylinder 192 are in the fully open position, all of the flow bypasses the channels 204a and the trenches 202a because the channels and trenches are not covered by the sealing pad. All flow at this set point on the flat surface 196a is restricted by the intersection of the sealing pad's central aperture 133d and the through-hole 198a. This configuration provides the maximum flow stroke position for the valve assembly 100 because the restriction through the inlet side of the hollow cylinder exposes the maximum possible flow area (minimum flow restriction) with the piston springs 114 (FIG. 6) stroke position in the maximum loaded condition. This maximum flow condition can be used to clean the channels 204a and trenches 202a because the flow path on the hollow cylinder 192 is exposed and the maximum flow condition exists to "wash out" the flow path.

Figure 10:
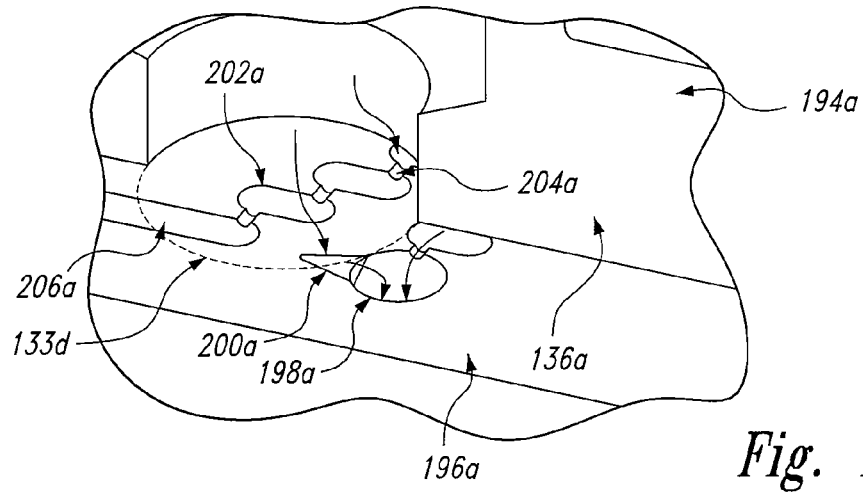
FIG. 10 is an enlarged isometric view and partial cutaway view of the geometry of the hollow cylinder and sealing pad of FIGS. 6 and 7 and in a reduced flow condition with three of the six notches bypassed.

FIG. 10 is an isometric view of the sealing pad 196a and the hollow cylinder 192 in a configuration wherein a portion of the V-shaped notch 200a, the through-hole 198a, and approximately three of the trenches 202a are covered by the flange portion of the sealing pad 136a. Three of the channels 204a are within the footprint of the central aperture 133d, and thereby bypassed from restricting the flow through the hollow cylinder. At this set point, the flow at flat surface 196a and into the through-hole has a parallel path. The majority of the flow passes into the through-hole 198a via the exposed portion of the V-shaped notch 200a. Another portion of the flow moves through the covered trenches 202a and channels 204a in series after the flow from the central aperture 133d into one of the trenches 202a that is exposed or only partially covered by the flange of the sealing pad 136a. The flow then passes through a channel 204a in the side of the partially covered trench 202a, then to the first completely covered trench 202a, then the next channel 204a, then to the next covered trench 202a, and to the next channel 204a where the flow enters through-hole 198a. This "in-series" restrictive flow path of channels 204a and trenches 202a is a parallel path to the flow passing through the partially exposed V-shaped notch and into the through-hole. FIG. 10 illustrates a reduced flow set point as compared to the flow set point illustrated in FIG. 8, because less flow area is exposed on the flat surface 196a, and the piston springs 114 (FIG. 6) are loaded less than in the position shown in FIG. 8, thereby producing a smaller pressure drop across the inlet side of the hollow cylinder.

Figure 11:
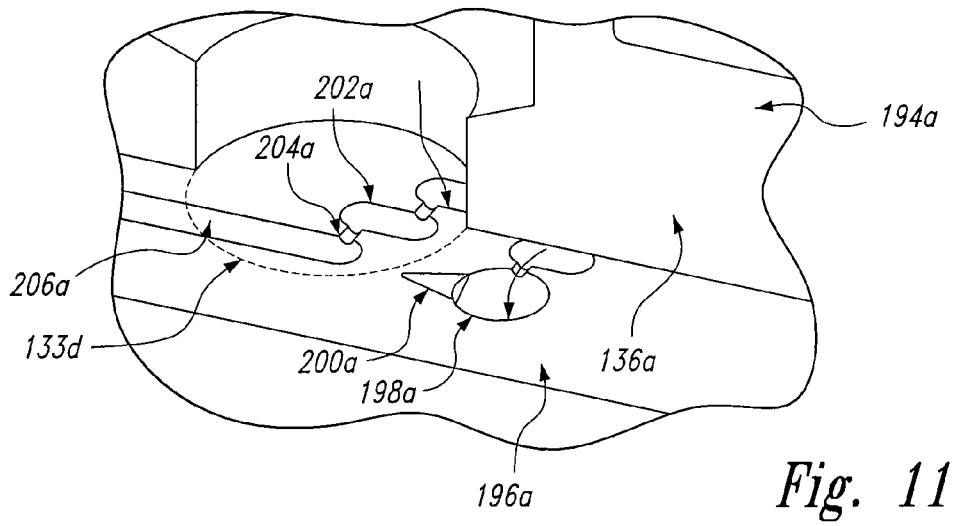
FIG. 11 is an enlarged isometric view and partial cutaway view of the geometry of the hollow cylinder and sealing pad of FIGS. 6 and 7 shown with two of the six notches bypassed.

FIG. 11 is an isometric view of the sealing pad 196a and the hollow cylinder 192 in a configuration wherein the V-shaped notch 200a and the through-hole 198a are fully covered by the flange portion of the sealing pad 136a. Two of the channels 204a are bypassed and the remaining four channels and associated trenches are covered, thereby restricting the flow through the inlet side of the hollow cylinder 192. At this set point, the flow at the flat surface 196a has only an in-series path to the through-hole 198a, wherein the flow passes into a portion of a trench 202a only partially covered by the sealing pad 136a. The flow then passes through the four channels 204a and three trenches 202 in series. The configuration illustrated in FIG. 11 provides a reduced flow set point compared to the configuration shown in FIG. 10, because there is less flow area exposed on the flat surface 196a. In addition, the piston springs 114 (FIG. 6) are loaded less than in the position shown in FIG. 10, thereby producing a smaller pressure drop across the inlet side of the hollow cylinder 192.

Figure 12:
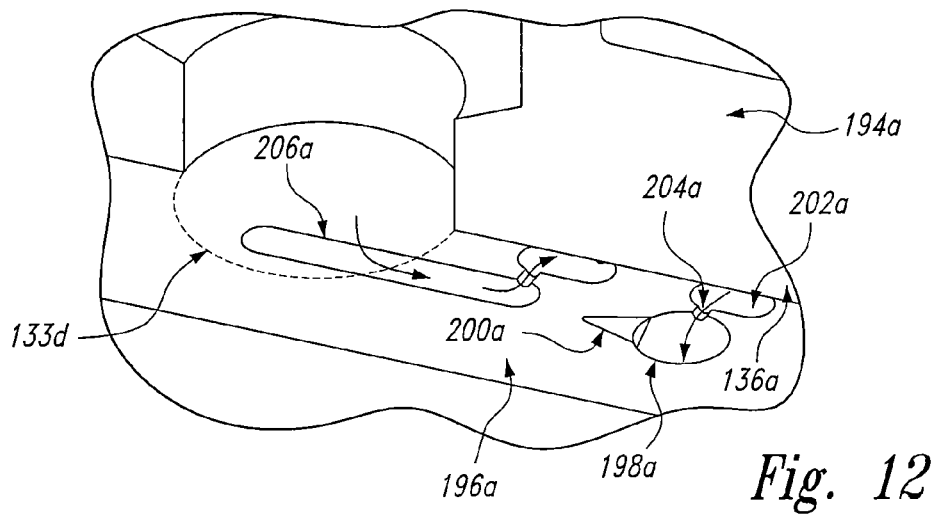
FIG. 12 is an enlarged isometric view and partial cutaway view of the geometry of the hollow cylinder and sealing pad of FIGS. 6 and 7 shown in the lowest flow condition with all flow passing through the six notches and interconnecting channels on each cylinder face in series.

FIG. 12 is an isometric view of the sealing pad 196a and the hollow cylinder 192 in a set point configuration wherein the V-shaped notch 200a, the through-hole 198a, and all of the channels 204a are fully covered by the sealing pad. At this set point, the flow at flat surface 196a has only a series path to the through-hole 198a where the flow passes into an uncovered portion of the longest trench 206a. The flow then passes in series through the six channels 204a and the five interspersed trenches 202a. The configuration illustrated in FIG. 12 provides a reduced flow set point compared to the set point illustrated in FIG. 11, because there is less flow area exposed on the flat surface 196a, and piston springs 114 (FIG. 6) are loaded less than in the position shown in FIG. 11, thereby producing a smaller pressure drop across the inlet side of the hollow cylinder 192. FIG. 12 illustrates a configuration wherein the flow rate set point is changed entirely by changing the tension in the piston springs 114.

As in the configurations shown in FIGS. 2-5, the sealing pad 136b shown in FIGS. 6 and 7 on the outlet side of the hollow cylinder 192 mates with the flat surface 196b shown in FIG. 8. Channels 204b, trenches 202b, and a V-shaped groove 200b referenced in FIG. 8 are substantially identical to the channels 204a, trenches 202a, and V-shaped notch 200a provided in the flat surface 196a on the inlet side of the hollow cylinder 192 discussed above. The channels 204b, notches 202a, and V-shaped groove 200b are positioned to be selectively exposed to the central aperture 133d in the sealing pad 136b or covered by the flange portion of the sealing pad, so as to provide a variable fluid resistor 194b that provides flow resistance to the fluid flow exiting hollow cylinder 192 and flowing into the sealing pad 136b and into the flow passageway 174 similar to the flow resistance configuration on the inlet side of the restrictor.

The second fluid resistor 194b on the outlet side can substantially increase the fluid resistance for the lower flow rate set points, thereby allowing very low flow rates to be achieved with the largest cross-sectional flow passages. In the lowest flow set point, the fluid flows from the inlet pressure P1 then passes in series through part of the elongated trench 206a, five trenches 202a and the interspersed six channels 204a and then into the through-hole 198a. The flow then passes through the inlet side of the hollow cylinder 192, and through the cavity 172 created by the inside diameter of the hollow cylinder and the outside diameter of the recessed spool portion 126. From the cavity 172, the flow passes out the through-hole 198b, then through six channels 204b and the interspersed five trenches 202b, all in series, and then into the central aperture 133d in the sealing pad 136b. The combined effect of the channels and trenches on the hollow cylinder is to produce a sequence of multiple flow restrictions in series that steps the fluid pressure down from P1 to P2. In other embodiments, there could be as few as one trench 202a and one channel 204a or more than five trenches 202a and channels 204a on flat surface 196a. Likewise there could be more or less trenches 202b and channels 204b on flat surface 196b. The fluid resistance for a restrictor 194a can be, but does not have to be, substantially identical to the resistor 194b.

The embodiment illustrated in FIGS. 6 and 7 include seals 152b and 154b adjacent to the sealing pad 136b and the pad guide 150b. These additional seals help prevent leaks out of cavity 172 through the ends of the hollow cylinder 192 into cavity 172 which is at fluid pressure P2, thereby preventing an inadvertent bypass of any of the six fluid resistors that make up fluid resistor 194b.

Figure 13:
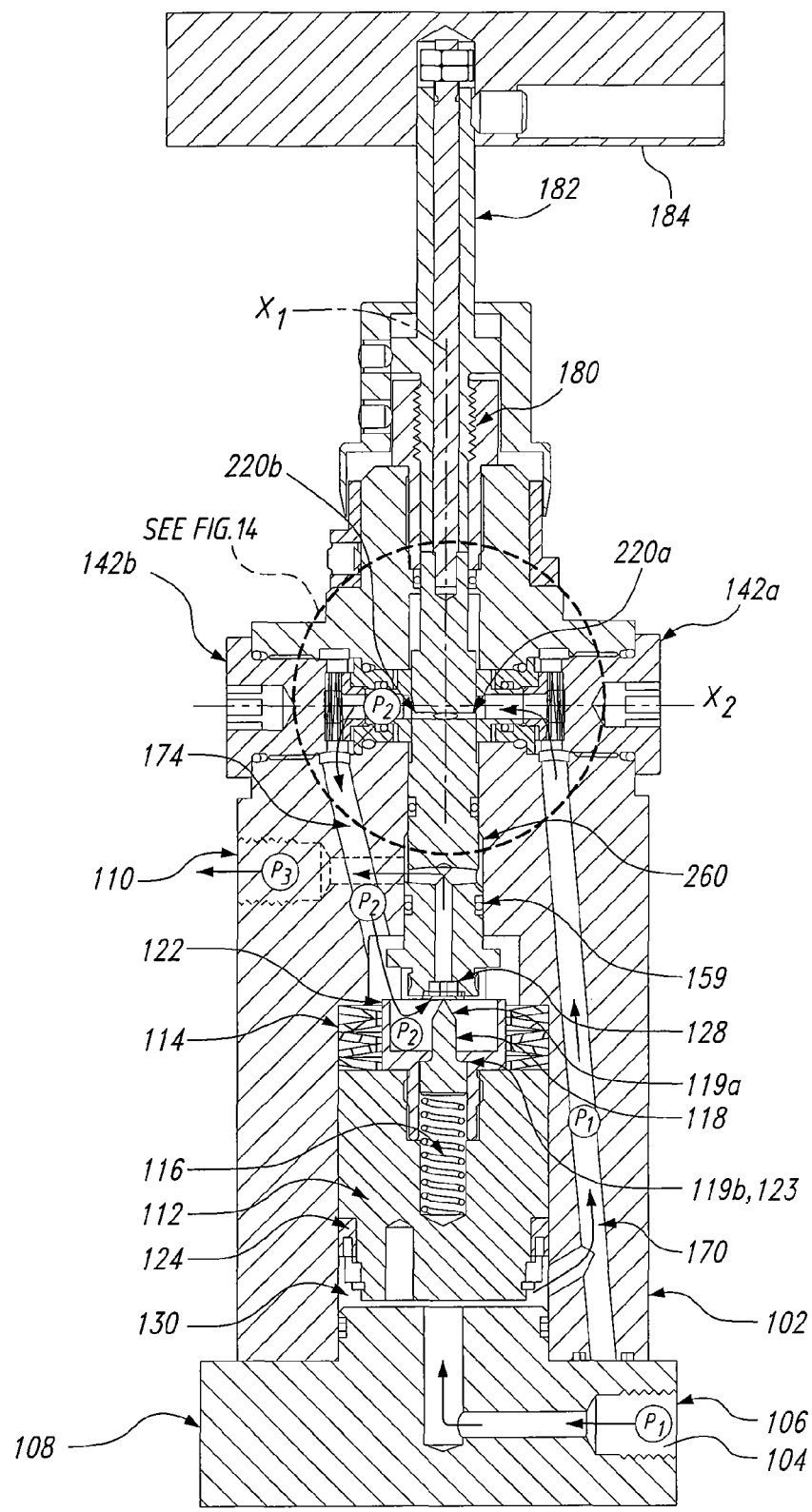
FIG. 13 is a schematic cross-sectional view of the valve assembly in accordance with another embodiment of the invention.
Figure 14:
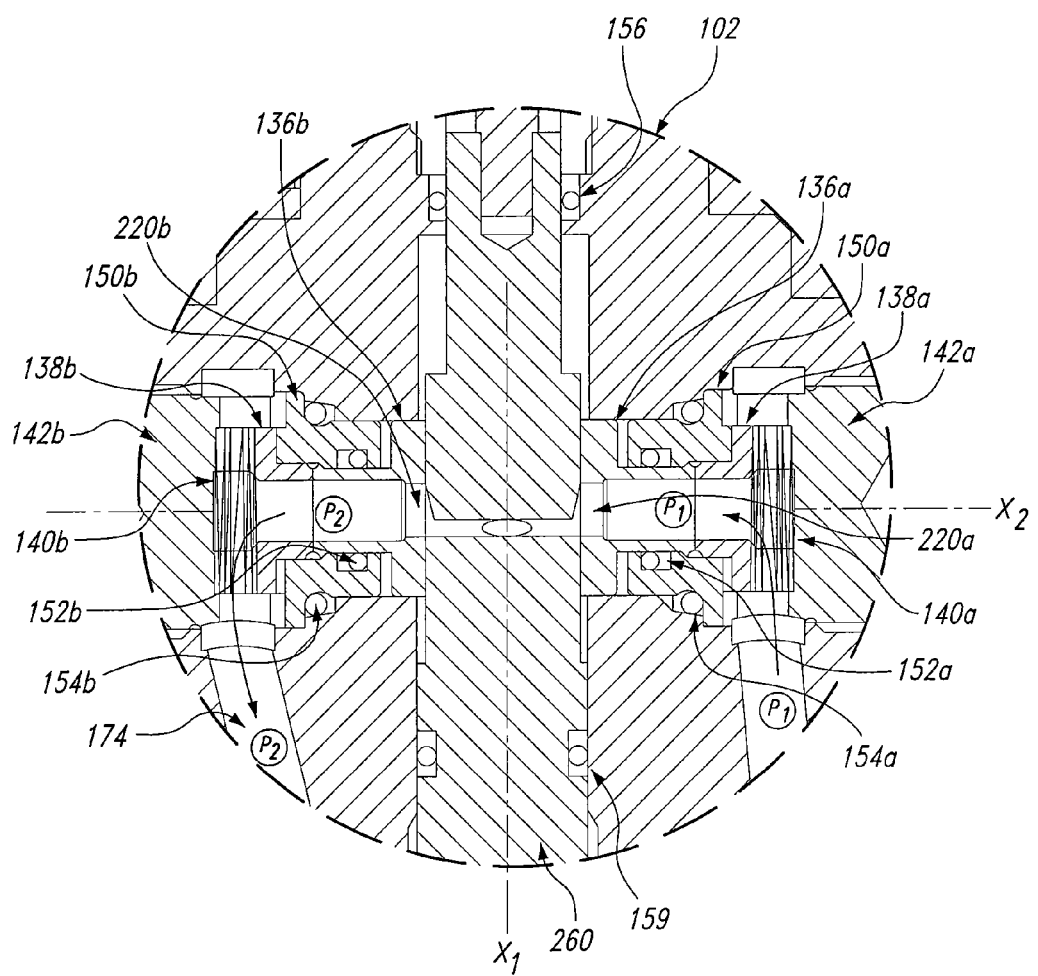
FIG. 14 is an enlarged cross-sectional view of a portion of the valve assembly where indicated in FIG. 13 and showing a restrictor assembly.
Figure 15:
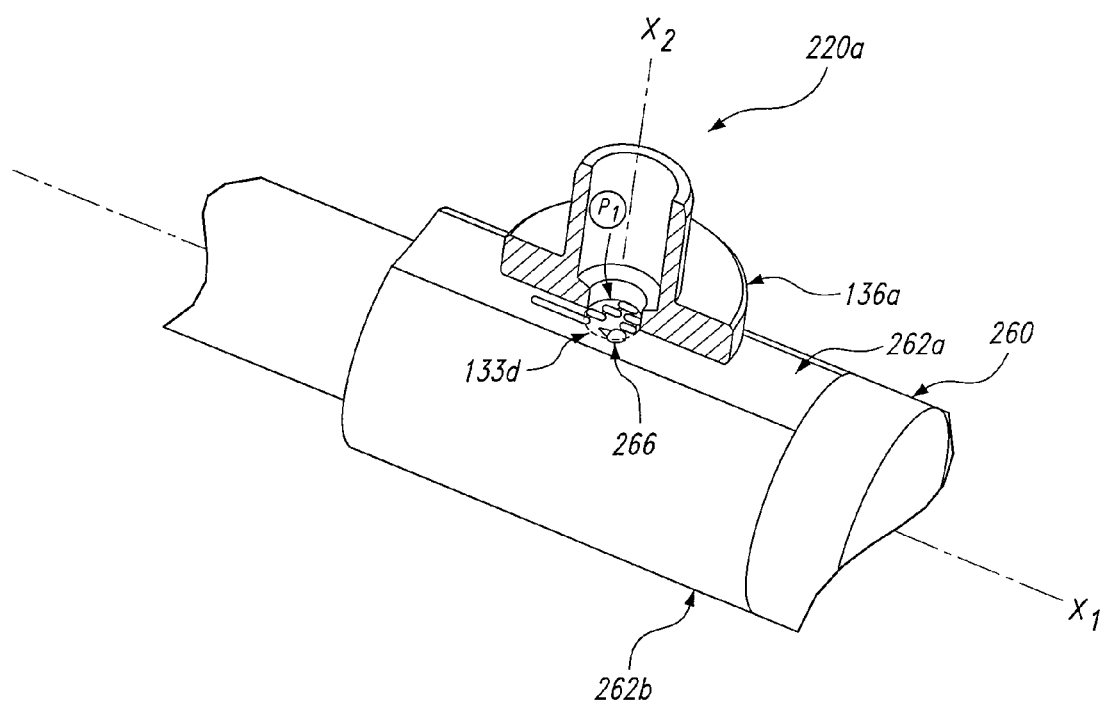
FIG. 15 is an enlarged isometric view and partial cutaway view of the geometry of the hollow cylinder and sealing pad shown removed from the valve assembly of FIGS. 13 and 14 for purposes of clarity and shown in the open-most condition.

FIGS. 13 and 14 are cross-sectional views of another embodiment of the valve assembly 100. In this embodiment, the sealing pads 136a and 136b are pressed into direct engagement with the shaft 125, rather than against the hollow cylinder 192 discussed above. In this embodiment, the shaft has an aperture 266 extending there through between the sealing pads 136a and 136b. Accordingly, this portion of the shaft engaged by the sealing pads 136a and 136b does not rotate when the handle 184 and/or power screw 180. FIG. 15 is an enlarged isometric view of the sealing pad 136a mating with the surface 262a on the inlet side of the shaft 125. In this figure a series of notches and channels are provided on the surface of the shaft 125, similar to those illustrated in FIG. 9 and discussed above, but the aperture 266 passes completely through the shaft. The aperture 266 can communicate with a series of cascading notches and channels in the shaft adjacent to the sealing pad on the outlet side of the restrictor.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A constant-flow valve assembly, comprising:
 a first fluid passageway configured to carry fluid at a first fluid pressure;
 a chamber having at least a portion configured to receive fluid at a second fluid pressure less than the first fluid pressure;
 a second fluid passageway connected to the portion of the piston chamber and configured to carry fluid at the second fluid pressure;
 a third fluid passageway configured to carry fluid at a third fluid pressure less than the first and second fluid pressures;
 a piston slideably disposed in the chamber;
 a biased valve member having a valve seat adjacent to the third passageway, a valve body, and a first biasing member coupled to the piston, and a second biasing member coupled to the valve body being urged by the second biasing member toward the valve seat and configured to provide a substantially constant fluid flow to the third passageway past the valve seat substantially independent of the pressure differentials between the second and third fluid pressures; and
 an adjustable restrictor assembly between the first and second fluid passageways, the restrictor assembly having an inlet portion, an outlet portion, and a restrictor with a fluid pathway extending therebetween, the inlet portion being positioned to receive fluid at the first fluid pressure from the first fluid passageway and to direct the fluid to the restrictor, and the outlet portion being positioned to receive fluid from the restrictor and direct fluid to the second fluid passageway at the second fluid pressure, the restrictor having an entry portion and an exit portion of the fluid pathway, the restrictor being movable to adjust the position of the entry and exit portions relative to the inlet and outlet portions to adjust a fluid flow rate of fluid through fluid pathway to the second fluid passageway and to automatically adjust the biased valve member for a constant flow rate of fluid through the valve assembly, and wherein the restrictor comprises a sleeve with an interior area and a central member disposed in the interior area, the fluid pathway extends through the sleeve and around the central member.

2. The assembly of claim 1 wherein the restrictor has an outer surface, the fluid pathway includes the entry portion defined by at least one a blind notch in the outer surface and in fluid communication with a through hole, the restrictor being movable to allow the inlet portion to interfere with at least a portion of the entry portion to adjustably restrict the fluid flow into through the restrictor and to control the fluid flow rate through the adjustable restrictor assembly.

3. The assembly of claim 1 wherein the restrictor has an outer surface, the fluid pathway includes the entry portion defined by a plurality of blind notches interconnected by at least one blind channel and in fluid communication with a through hole, the restrictor being movable to allow the inlet portion to interfere with at least a portion of the entry portion to adjustably restrict the fluid flow into the blind notches, blind channel, or through hole and to control the fluid flow rate through the adjustable restrictor assembly.

4. The assembly of claim 3 wherein the restrictor body is movable so at least a portion of the through hole remains uncovered and at least one blind notch adjacent to the through hole is fully covered, whereby the through hold receives a fluid simultaneously in parallel from the covered blind notch and directly from the inlet portion.

5. The assembly of claim 1 wherein the restrictor includes an exterior surface with the entry portion thereon, and the inlet portion includes a body segment with an aperture in fluid communication with the first fluid passageway and with the first entry portion, the body segment engaging the exterior surface of the restrictor body so at least a portion of the aperture is in direct fluid communication with the entry portion.

6. The assembly of claim 1, further comprising an external adjustment device coupled to the restrictor assembly, the adjustment device being manipulatable to move the restrictor assembly to change the position of the restrictor relative to the inlet portion.

7. The assembly of claim 1 wherein the restrictor has an outer surface, the fluid pathway includes the exit portion defined by at least one a blind notch in the outer surface and in fluid communication with a through hole, the restrictor being movable to allow the outlet portion to interfere with at least a portion of the exit portion to adjustably restrict the fluid flow into through the restrictor and to control the fluid flow rate through the adjustable restrictor assembly.

8. A constant-flow valve assembly, comprising:
a first fluid passageway with fluid at a first fluid pressure;
a chamber containing fluid at a second fluid pressure less than the first fluid pressure;
a second fluid passageway connected to the portion of the chamber and containing fluid at the second fluid pressure;
a third fluid passageway with fluid at a third fluid pressure less than the first and second fluid pressures;
a biased valve member having a valve seat adjacent to the third passageway, a valve body, and a first biasing member coupled to the piston, and a second biasing member, the valve body being urged by the second biasing member toward the valve seat and configured to provide a substantially constant fluid flow to the third passageway past the valve seat substantially independent of the pressure differentials between the second and third fluid pressures; and
a restrictor assembly between the first and second fluid passageways, the restrictor assembly having a first sealing pad, a second sealing pad, and a restrictor with a fluid pathway extending therebetween, the first sealing pad being positioned to receive fluid at the first fluid pressure from the first fluid passageway and to direct the fluid to the restrictor, and the second sealing pad being positioned to receive fluid from the restrictor and direct fluid to the second fluid passageway at the second fluid pressure, the restrictor being movable to adjust the position of the fluid pathway relative to the inlet and outlet portions to adjust a fluid flow rate of fluid through fluid pathway to the second fluid passageway, thereby automatically adjusting the biased valve member to provide a substantially continuous flow rate through the valve assembly independent of the pressure differentials, and wherein the restrictor comprises a sleeve with an interior area and a central member disposed in the interior area, the fluid pathway extends through the sleeve and around the central member.

9. The assembly of claim 8 wherein the restrictor has an outer surface, the fluid pathway includes the entry portion defined by at least one a blind notch in the outer surface and in fluid communication with a through hole, the restrictor being movable to allow the first sealing pad to cover at least a portion of the entry portion to adjustably restrict the fluid flow into through the restrictor and to control the fluid flow rate through the adjustable restrictor assembly.

10. The assembly of claim 8 wherein the restrictor has an outer surface, the fluid pathway includes the entry portion defined by a plurality of blind notches interconnected by at least one blind channel and in fluid communication with a through hole, the restrictor being movable to allow the first sealing pad to interfere with at least a portion of the entry portion to adjustably restrict the fluid flow into the blind notches, blind channel, or through hole and to control the fluid flow rate through the adjustable restrictor assembly.

11. The assembly of claim 8, further comprising an external adjustment device coupled to the restrictor assembly, the adjustment device being manipulatable to move the restrictor assembly to change the position of the restrictor relative to at least one of the first and second sealing pads.

12. A constant-flow valve assembly, comprising:
a body portion having a first fluid inlet, a piston chamber, and a first fluid outlet, the first fluid inlet configured to receive fluid at a first fluid pressure, the piston chamber having a first portion exposed to the fluid at the first fluid pressure and having a second portion exposed to fluid having a second fluid pressure less than the first fluid pressure, and the first fluid outlet configured to carry fluid at a third fluid pressure less than the first and second fluid pressures;
a piston slideably disposed in the piston chamber;
a seal in the piston chamber between the piston and the body and separating one portion of the fluid at the first fluid pressure and another portion of the fluid at the second fluid pressure;
a valve member coupled to the piston in the second portion of the piston chamber and configured to provide a substantially constant fluid flow from the second portion of the piston chamber toward the outlet substantially independent of the pressure differentials between the first, second, and third fluid pressures;
a first fluid passageway connected to the first portion of the piston chamber and configured to contain fluid at the first fluid pressure;
a second fluid passageway connected to the second portion of the piston chamber and configured to contain fluid at the second fluid pressure; and
an adjustable restrictor assembly coupled to the body between the first and second fluid passageways, the restrictor assembly having a second inlet, a second outlet, and restrictor body with a fluid pathway extending therebetween, the second inlet positioned to receive fluid from the first fluid passageway, and the second outlet positioned to direct fluid to the second fluid passageway, the restrictor body having an entry portion and an exit portion of the fluid pathway, the restrictor body being movable relative to the second inlet to adjust how much of the entry portion is uncovered by the second inlet to receive fluid directly therefrom and how much of the entry portion is covered by the second inlet to restrict a flow rate through the entry portion to the exit portion, thereby adjusting the flow rate through the valve assembly independent of the differences in the first, second, and third fluid pressures, and wherein the restrictor body comprises a sleeve with an interior area and a central member disposed in the interior area, the fluid path extends through the sleeve and around the central member.

13. The assembly of claim 12 wherein the restrictor body has an outer surface with at least one a blind channel in fluid communication with an aperture to define the entry portion, the restrictor body being movable relative to the second inlet to cover at least a portion of the aperture and the blind channel on the outer surface to adjust the fluid flow rate through the flow pathway.

14. The assembly of claim 12 wherein the restrictor body has an outer surface with a plurality of blind receptacles interconnected in series by channels and in fluid communication with an aperture to define the entry portion, the restrictor body being movable relative to the second inlet to cover at least a portion of the aperture and one or more of the blind receptacles to adjust the fluid flow rate through the flow pathway.

15. The assembly of claim 14 wherein the restrictor body is movable so at least a portion of the aperture remains uncovered and at least one blind receptacle adjacent to the aperture is fully covered, whereby the aperture receives a fluid simultaneously in parallel from the covered receptacle and directly from the second inlet.

16. The assembly of claim 12 wherein the restrictor body is a shaft with an aperture therethrough, the fluid pathway extending through the aperture in the shaft.

17. The assembly of claim 12 wherein the restrictor body includes an exterior surface with the entry portion thereon, and the second inlet includes a body segment with an aperture in fluid communication with the first fluid passageway and with the entry portion, the body segment engaging the exterior surface of the restrictor body so at least a portion of the aperture is in direct fluid communication with the entry portion.

18. The assembly of claim 12, further comprising an external adjustment device coupled to the restrictor assembly, the adjustment device being manipulatable to move the restrictor assembly to change the position of the restrictor body relative to the second inlet.

19. The assembly of claim 12 wherein the restrictor body has an outer surface with at least one a blind channel in fluid communication with an aperture to define the exit portion, the restrictor body being movable relative to the second outlet to cover at least a portion of the aperture and the blind channel on the outer surface to adjust the fluid flow rate through the flow pathway.

20. The assembly of claim 12 wherein the restrictor body has an outer surface with a plurality of blind receptacles interconnected in series by channels and in fluid communication with an aperture to define the exit portion, the restrictor body being movable relative to the second outlet to cover at least a portion of the aperture and one or more of the blind receptacles to adjust the fluid flow rate through the flow pathway.

21. The assembly of claim 20 wherein the restrictor body is movable so at least a portion of the aperture remains uncovered and at least one blind receptacle adjacent to the aperture is fully covered.

22. The assembly of claim 12 wherein the restrictor body includes an exterior surface with the exit portion thereon, and the second outlet includes a body segment with an aperture therethrough in fluid communication with the first fluid passageway and with the entry portion, the body segment sealably engaging the exterior surface of the restrictor body so at least a portion of the aperture is in direct fluid communication with the exit portion.

23. A constant-flow valve assembly, comprising:
a body portion having a first fluid inlet, a piston chamber, and a first fluid outlet, the first fluid inlet configured to receive fluid at a first fluid pressure, the piston chamber having a first portion exposed to the fluid at the first fluid pressure and having a second portion exposed to fluid having a second fluid pressure less than the first fluid pressure, and the first fluid outlet configured to carry fluid at a third fluid pressure less than the first and second fluid pressures;
a piston slideably disposed in the piston chamber;
a seal in the piston chamber between the piston and the body and separating one portion of the fluid at the first fluid pressure and another portion of the fluid at the second fluid pressure;
a valve member coupled to the piston in the second portion of the piston chamber and configured to provide a substantially constant fluid flow from the second portion of the piston chamber toward the outlet substantially independent of the pressure differentials between the first, second, and third fluid pressures;
a first fluid passageway connected to the first portion of the piston chamber and configured to contain fluid at the first fluid pressure;
a second fluid passageway connected to the second portion of the piston chamber and configured to contain fluid at the second fluid pressure; and
an adjustable restrictor assembly coupled to the body between the first and second fluid passageways, the restrictor assembly having a second inlet portion, a second outlet portion, and restrictor body with a fluid pathway extending therebetween, the second inlet portion positioned to receive fluid from the first fluid passageway, and the second outlet portion positioned to direct fluid to the second fluid passageway, the restrictor body having an entry portion and an exit portion of the fluid pathway, the restrictor body being movable relative to the second inlet portion to adjust how much of the entry portion is uncovered by the second inlet portion to receive fluid directly therefrom and how much of the entry portion is covered by the second inlet portion to restrict a flow rate through the entry portion to the exit portion, thereby adjusting the flow rate through the valve assembly independent of the differences in the first, second, and third fluid pressures wherein the restrictor body of the adjustable restrictor assembly is a portion of a central shaft, the central shaft having an end portion having a passageway therein adjacent to the valve member and configured to direct fluid from the valve member to the outlet.

* * * * *